Aug. 30, 1966 L. M. ABELL ETAL 3,269,832
PROCESS OF FORMING AGGREGATES OF METAL BEARING ORES FOLLOWED BY
QUIESCENT SUBMERGENCE IN A SOLVENT
Filed April 2, 1962
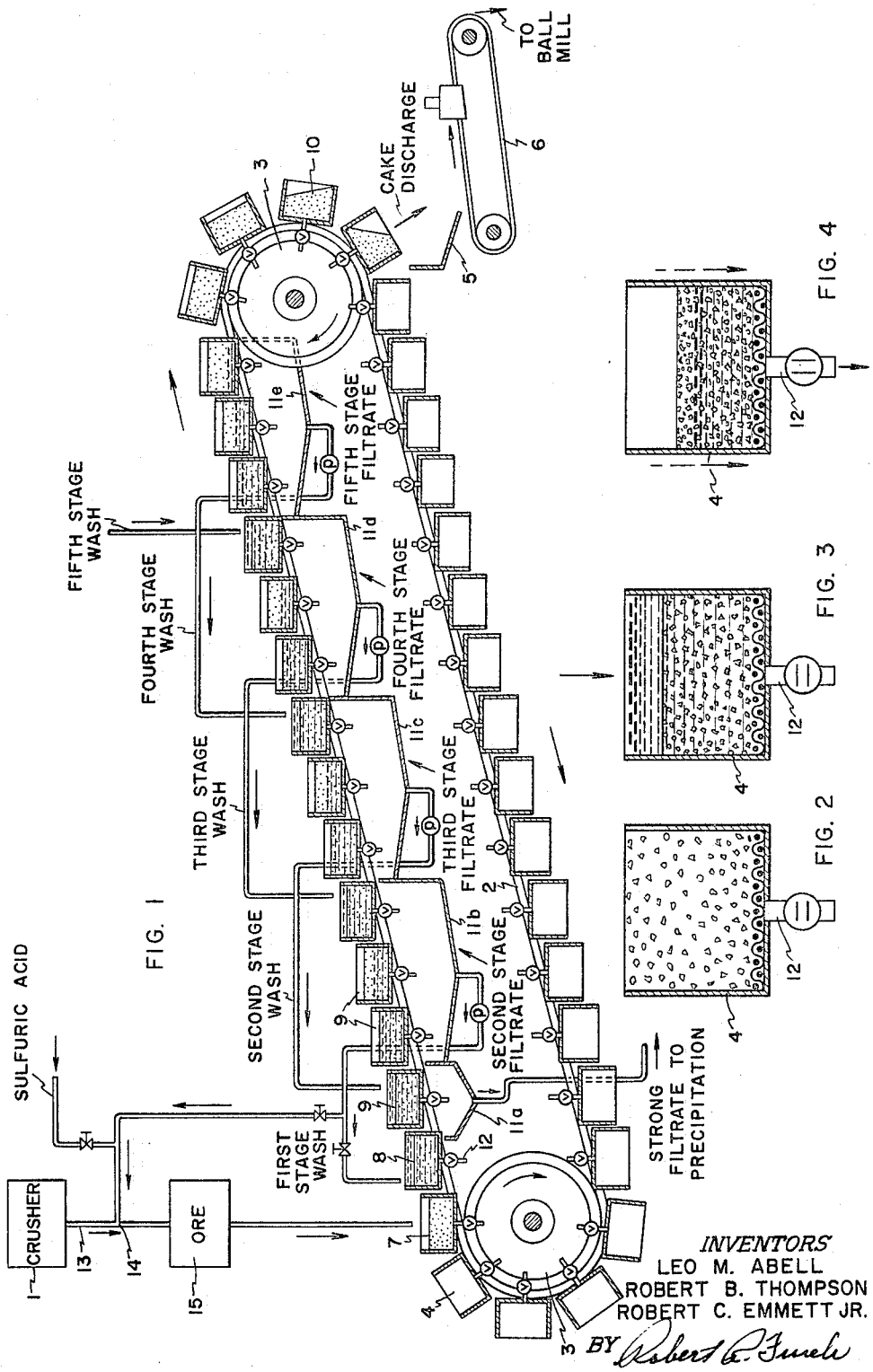
INVENTORS
LEO M. ABELL
ROBERT B. THOMPSON
ROBERT C. EMMETT JR.
BY Robert C. Finch
ATTORNEY

United States Patent Office 3,269,832
Patented August 30, 1966

3,269,832
PROCESS OF FORMING AGGREGATES OF METAL BEARING ORES FOLLOWED BY QUIESCENT SUBMERGENCE IN A SOLVENT
Leo M. Abell, Morenci, Ariz., Robert C. Emmett, Jr., Barrington, Ill., and Robert B. Thompson, Salt Lake City, Utah, assignors to The Eimco Corporation, Salt Lake City, Utah, a corporation of Delaware
Filed Apr. 2, 1962, Ser. No. 184,054
6 Claims. (Cl. 75—117)

This invention relates to a novel process for the recovery of metals from their ores, such as oxidized copper from ore, and more particularly oxide copper values, which are not efficiently recoverable by the usual processes for the benefication of copper ores, and the recovery of copper therefrom.

Most benefication processes for the concentration of copper ores leading to the recovery of copper employ various floatation processes which concentrate the copper bearing minerals. Generally, must of the copper is combined in the ore as a sulfide and, to some extent, as an oxide. Subsequently, the concentrated ore is treated to recover the raw copper as metallic copper. The flotation procedures, however, are directed primarily to the recovery of the copper from the sulfide form, and consequently any oxide copper values are lost in the tailings because their recovery is not economical. This results in the loss of a few pounds of copper per ton of raw ore treated. When viewed in the light of a large scale operation in which many thousands of tons are treated, this loss constitutes a serious waste of a valuable metal.

While the advantages to be gained from the recovery of the oxide copper values from the tailings are obvious, no process has heretofore been devised which is economically feasible for this purpose. It can readily be appreciated that when a process which is in itself expensive to perform is utilized, any attendant advantages to the recovery of the copper are lost, and the entire operation becomes unprofitable.

Resort to an acid leaching of the copper ore mass prior to the usual flotation processes in an attempt to recover copper oxide values or other acid-soluble values has generally been unsuccessful because the complexities introduced by such a step usually overcame any of the advantages to be gained by its utilization. This pretreatment or leaching operation has generally been unsatisfactory because of the large amount of wash water necessary and the difficulty in removing the leachings and washings from the ore.

In the conventional acid leaching of ores, especially of those ores which contain a considerable amount of finely divided solids which tend to form slimes, extreme difficulty has been encountered in separating the liquid phase from the solid phase. The difficulty has been traced to the large amounts of slime formed by the fine ore particles in the ore mass. It is not uncommon, for example, to produce 10–15% of slime for each ton of ore treated. In order to separate the liquid and solid phases, filtration has been extensively explored for this purpose. Filtration equipment, however, has not previosuly proved to be effective because the slimes formed by the fines and the large amounts of water utilized in conventional leaching processes, clogged or blinded the filtering means, greatly impeding, if not altogether stopping, the flow of liquid through the filter medium. The inability of the filter to handle the slimes without clogging, coupled with the high cost of installation and maintenance of such equipment has shown that filtration alone is not adequate. In order to increase the flow of liquid through the filters, many resorted to vacuum filtration to assist in removal of water. Vacuum filtration has not proved to be succeessful in overcoming the problem because it also drew the slime carrying liquids further into the filter, reducing the porosity of the filter and the rate of flow of wash liquid through the filter. In addition, the high cost of such equipment tended to make the recovery of small amounts of copper uneconomical and unjustified.

In accordance with the present invention, it has been found that many problems attending the recovery of metal values from thir ores, and particularly oxide copper values from copper ore, are attributable to the solvent leaching process utilized and to the nature of the filtration procedures heretofore used to separate the liquid phase from the solid ore mass phase. Experiments have shown that formation of slimes is caused by the fines in the crushed ore and large amount of liquid utilized during leaching. And further, that agitation of the ore mass during leaching in order to insure full contact of the leaching solution with the ore enhanced the formation of the undesirable slimes. It has also been discovered that a submerged or flood water washing treatment of the ore subsequent to leaching followed by gravity drainage is more effective in recovering the copper oxide values than the conventional methods of washing and filtration, including spray washing and vacuum filtration.

Accordingly, it is an object of this invention to effect the recovery of metals from their ores, especially oxide copper values from copper ores, with minimum amounts of leaching solution and with little or no agitation of the ore mass during leaching.

It is another object of this invention to substantially eliminate the formation of slimes during leaching of ores, but at the same time convert the metal values to a form which may be readily and inexpensively removed from the ore mass.

It is a further object to treat the leached ore mass in such a manner as to quickly and economically remove the dissolved metal values in a liquid form which may be easily treated to liberate the metal.

It is another object of this invention to treat the ore mass during leaching so that the reacted metal values may be removed in liquid form by flood washing followed by gravity drainage withont the assistance of any vacuum or suction.

It is an additional object to recover copper from the oxide copper values in a manner which is economical, and does not require the use of complex equipment.

These and other objects will be apparent to those skilled in the art from the present description and the appended drawing, in which:

FIG. 1 is a schematic flow diagram of the process of the invention.

FIGS. 2, 3 and 4 illustrate schematically the nature of the flow of wash liquor through the ore mass in the pans.

While the process of the invention will be described primarily with regard to the recovery of oxide copper values from copper ores by acid leaching followed by filtration, it is just as applicable to the recovery of other metal values from their ores by solvent leaching followed by soak washing conducted in accordance with the invention.

In its broadest aspects, the invention comprises a process in which the ore mass, such as a copper ore mass, to be treated is first moistened by contact with an aqueous solvent leaching solution, an aqueous acid solution in the case of copper ores, to convert the metal values to a soluble salt of the metal, and then subjecting the moistened ore mass to a particular washing treatment to remove the dissolved metal salts in a filtrate. The aqueous solvent extracts and the wash liquor are subsequently subjected to known procedures, such as chemical precipitation, to recover the free metal. The extracted and washed ore is then subsequently subjected to flotation treatments, in the case of copper ore, with which those skilled in the art are familiar, to recover the copper sulfide values which constitute the principal source of copper in the ore.

In the process of this invention, the ore is first subjected to a suitable crushing operation. It has been found that crushing to an average particle size of about 3/8 of an inch with a relatively small amount of fines is suitable.

The crushed ore, including the fines, is then contacted with a leaching solution. This may be conveniently accomplished by spraying the leaching solution on to the crushed ore as it leaves the crushing machinery. Conveyors associated with the crushing machinery are utilized to transport the moistened ore to a reactor tank or bin. These conveyors are preferably provided with mixing devices in order that the entire ore mass may be uniformly contacted and moistened. Chutes provided with baffles for example, may be utilized for accomplishing this purpose, although any other suitable conveyor and mixing apparatus may be utilized.

The moistened and mixed ore mass is then delivered to a large container, such as a tank or bin, in which it is detained for the time required for the acid component of the leaching solution to react with the leachable constituents of the ore. No additional mixing or agitation of the ore mass is required while it is in the reactor. In fact, violent or severe mixing should be avoided during leaching because agitation tends to release or form a slime which becomes thoroughly dispersed throughout the ore mass. The presence of this slime is undesirable because it places a burden on the separation equipment utilized in subsequent steps, making separation of the washings expensive and inefficient.

The leaching solution contemplated by this invention during the leaching treatment described for oxide copper recovery, is composed essentially of a dilute aqueous solution of a mineral acid, such as sulphuric, hydrochloric and hydrobromic acids. Sulphuric acid has been found to be particularly useful. Aqueous acid leaching solutions are suitable for other ores, such as vanadium and uranium ores. Alkaline carbonate and bicarbonate solutions are suitable for some uranium ores. In the case of gold and silver ores, aqueous alkali cyanide solutions may be employed. Tin concentrates may be leached with a hydrochloric acid solution. The effect of the leaching solution as utilized in this invention is two-fold.

The acid component reacts with some of the copper compounds in the ore, such as copper oxide, to form a water-soluble copper salt, such as cupric sulfate, cupric chloride, etc.

The water constituent, in moistening the ore, effects agglomeration of the ore. By agglomeration is meant the tendency of the fine ore particles to become associated with the relatively larger ore particles. This agglomeration in the leaching operation is important to later steps of the process in which the leached ore is subjected to a soak washing treatment with water or dilute liquor. Agglomeration of the ore occurs while the ore mass, after being contacted with the leaching solution, is being simultaneously conveyed and mixed after leaving the crushers and during its residence in the reactor tank. The amount of water in the leaching solution required to achieve agglomeration is dependent upon the type of ore and its particle size. With copper ores crushed to an average particle size of about 3/8 of an inch, the optimum amount of water is that amount sufficient to increase the total moisture content of the ore mass to about 6 to 8%. Ore crushed to pass through an 8 mesh screen requires as an optimum amount of water an amount sufficient to increase the total moisture content to about 8 to 11%, while ore crushed to a size which passes through a 65 mesh screen desirably employs an amount of water to increase the total moisture content to about 18%.

As the particle size decreases, and the surface area of the ore mass increases, the amount of water required to achieve agglomeration also increases. Ore masses with a substantial amount of fines having a particle size of about 325 mesh may be treated by controlling the moisture content of the ore mass in accordance with this invention. It should be understood that the water required to maintain the proper concentration in the leaching solution applied to the ore mass may be obtained by either resort to fresh make-up water, or by utilizing water recycled from a subsequent step of this invention described below, or from both sources.

The moistened ore mass is permitted to stand in the reactor tank for at least about one hour at the room or ambient temperature. This contact time has been found the most desirable for permitting the acid to react with the copper or other leachable compounds in the ore.

After the leaching treatment has proceeded for the desired length of time, the moist leached ore is discharged from the tank into one or more horizontal pans or filter beds. These pans or beds are associated with means for flooding or submerging the ore mass with wash liquor and are provided with outlets in the bottoms to permit drainage of the wash liquor after it passes through the ore by gravitational flow.

During the wash, the agglomerated fines remain associated or attached to the coarse particles, and do not separate out as slimes. The result is a more uniform movement of the wash solution through the ore mass, and is attributable to the controlled moistening of the ore during the dilute acid leaching operation.

The relative ease with which the wash water and leachings are able to pass through the ore mass by gravity forces or ordinary drainage eliminates the need for any vacuum or suction to be applied to the pans or beds and, in fact, it has been discovered that suction is disadvantageous. It is proposed that the leached ore remain in a flooded or submerged soaking condition for a relatively short period of time, as for example 30 seconds to one minute, before the wash water is permitted to drain through the mass by gravitational forces. This short static soak insures that the wash liquor will surround all the individual particles to dissolve the soluble copper or other metal salt for removal in the filtrate which is collected as it drains from the ore mass and either recycled back to the pans in order to repeat the flood washing, as in a stage to stage treatment, or passed directly to further treatment to recover the copper as metallic copper, such as by precipitation with metallic sponge iron. The ore mass, after washing and drainage, is passed to a grinding station to prepare it for the customary flotation procedures to recover the remaining copper values which are primarily in sulfide form.

The advantages of the process of the present invention are made possible by the unique combination of aqueous leaching solvent using a minimum quantity of water, less than that amount which would produce a slurry or dispersion of ore, followed by a static soak and one or more additional soakings or submerged wash of the leached ore. The wash, subsequent to the static soak may be conducted under conditions of continuous submergence. The leaching treatment agglomerates the particles of ore and minimizes slime formation. The initial static soak followed by ordinary draining effects some compaction of the ore mass which aids in better dispersion of subsequently applied wash solutions.

Example I

A preferred form or example of the invention is shown in conjunction with the appended drawing, in which:

FIG. 1 is a schematic flow diagram of the process of the invention while FIGS. 2–4 illustrates the type of wash solution flow through the leached ore mass.

In the preferred embodiment of the invention, demonstrating application of the process to a copper ore, the ore is crushed at a crushing station designated as 1. One starting ore is a porphyry ore containing about 0.77% sulfide copper, 0.13% oxide copper, 40% silica (as quartz), 30% felspar, 15% clay, 3.5% pyrite and the remainder inert materials. From the crusher, the ore is transported via conveyors, generally indicated at 13, provided with mixing devices. The leaching solution is introduced to the ore mass, as at 14, and is uniformly mixed with the ore as the ore mass is conveyed from the crusher to the reactor tank 15 by means of the mixing devices associated with the conveyors. The leach solution should be applied to the ore in such a manner and in such quantities so that the desired reaction may take place, and at the same time insure a uniform moistening of the ore mass. It has been found that with a ton of copper ore, about 8 pounds of sulfuric acid is sufficient as to the acid component. The water accompanying this quantity of acid should be sufficient to increase the total moisture content of the ore to be in the range from about 7% to 15%, preferably about 10%. The moistened ore enters the reactor tank 15 through a suitable opening and is detained therein without agitation for approximately one hour, at the ambient temperature. This tank need not be of special construction but may be an existing ore bin customarily utilized in ore concentrator operations. At the end of the one hour time interval, the ore is discharged through a suitable opening in the bottom of the reactor tank into a series of drainage pans.

The drainage pans 4 are pivotally mounted on an endless conveyor 2, trained about suitable sprockets or mounting drums 3. These pans may be of any suitable shape, and for convenience, they are shown as being rectangular and open at their upper end to receive ore discharged from the tank 15. Each of the pans is provided with a valved outlet 12 which permits discharge of the wash liquor through the bottom. The pans are so mounted on the endless conveyor that they will readily pivot as the conveyor follows its path around the mounting drums 3. At the same time, the pans are mounted such that the outlets 12 may readily communicate with the filtrate collection chambers 11a, 11b, 11c, 11d and 11e to discharge the filtrate therein as the pans move on the endless conveyor.

In a lower portion of each pan, a false bottom may be provided as a support for the ore deposited in the pan. This support may be in the nature of a filter medium composed of a suitable screen which should be strong enough to support the weight of the ore deposited thereon, and a large enough mesh to permit drainage of large amounts of liquid in relatively short periods of time. A suitable combination is an 8-mesh stainless steel wire screen sandwiched between two 4-mesh screens.

Assuming that the endless conveyor 2 is moving to the right as shown by the arrow in the drawing, the acid-moistened-leached ore is deposited in the pan directly beneath it, as at 7, and will continue to be deposited into the pans as they pass in series beneath the discharge opening of the leaching tank.

As shown in the drawing, fifteen pans contain acid-moistened-leached ore undergoing washing under periodical flooded or submerged conditions along the upper run of the conveyor 2, and an additional four pans at the extreme right, contain ore completely washed and ready for discharge.

As shown in FIGS. 2–4, the ore as initially received in a pan 4 is only slightly moist (FIG. 2) and relatively loosely piled. However, upon being subjected to the first stage wash or static soak, and this is accomplished with the valve 12 closed, some compaction occurs and such compaction progresses further as the liquor drains out (FIGS. 3–4).

The initial static soak, even though of relatively short duration (30–60 seconds) is important because it insures complete immersion and uniform wetting of all the agglomerated particles. It also effects the compaction noted above. These two factors play an important part in establishing the proper flow patterns in subsequent stages of washing. In this connection, it is to be noted that the valve 12 remains open after the static soak and complete immersion of the ore is insured by supplying wash liquor at a rate greater than the drainage through the valve. This, coupled with the agglomerated condition of the ore, brings about the highly desirable plug flow or true displacement washing such as shown in FIGS. 3 and 4. In this type flow channeling is avoided and washing efficiency increased due to complete immersion of the individual ore particles.

It is obvious, of course, that the number of pans, and the cycle of the pans along the path of the conveyor may be such that an empty pan will be directly beneath the discharge opening of a leaching or reactor tank 15 in order that the operation will be substantially continuous.

As is evident from the drawing, the wash water flow is substantially counter-current to the travel of the pans. In the initial operation of the pans and conveyor, the discharge opening of the pan is closed at the time acid-moistened-leached ore is deposited in the pan. The opening 12 remains closed during the period of initial contact with wash solution, as at 8, after which it is opened by any suitable means, or by an automatic tripping mechanism spaced along the path of the conveyor. When the pan reaches the area designated as the fourth stage, fresh wash water is introduced in sufficient quantity to cover the contents of the pan, the opening 12 remaining opened. As the conveyor continues to move, the pan receiving fresh water does not begin to substantially drain until it is within the area designated fifth stage, and is directly above the fifth stage filtrate collecting chamber 11e. During the time the pans pass over this chamber, substantially all of the water has been drained by gravity and collected in the collecting chamber, and the pans are ready to discharge the cake as shown at 10 for subsequent recovery of copper values.

As the water drains through the flooded pans at the fifth stage, it is actually a filtrate containing some of the residual dissolved copper sulfate formed during the leaching stage. The filtrate from the fifth stage is then pumped to the pans leaving the area designated third stage and entering the fourth stage in sufficient quantity to cover the contents of the pans. At the fourth stage, the liquid drains by gravity through the pans and is collected as fourth stage filtrate in collection chamber 11d.

The fourth stage filtrate is then pumped into the pans leaving the second stage area and entering the third stage area, as shown, covering the contents of the pans. This procedure continues in the same fashion in counter-current operation until the filtrate is removed from the first stage into collection chamber 11a. The filtrate from this stage, that is, that filtrate which is discharged shortly after the pan discharge 12 opens and before the pans enter the second stage, is the concentrated filtrate. It is this filtrate which is taken to a precipitation station, at which time the copper in sulfate form is precipitated from the solution and recovered as raw copper by methods known to those skilled in the art.

After the copper has been removed from the wash solution, the stripped or barren solution may be either recycled for use as wash water or used as leaching solution. Optionally, some of the filtrate from the second stage may be diverted to the acid-water leaching solution to conserve both water and unreacted acid as shown in the drawing.

It is important that each pan receives sufficient wash solution to completely flood or submerge the ore mass within the pan in order to remove as much of the soluble copper salt as possible, and at the same time to insure proper natural drainage by gravity. Spray washing is to be avoided as it tends to produce channeling of the wash water through the ore mass.

The washed and drained cake, as 10, after leaving the pans, passes down a chute 5, onto an endless conveyor 6, or may be delivered directly to a grinder or crusher preparatory to subjecting the ore to further flotation processes to recover the copper sulfide values.

As will be evident from the above description, the process of this invention is both effective in that it removes the oxide values of copper, and at the same time is economical.

The process provides for the use of minimum quantities of acid under conditions which produce the optimum results both as to the reaction of the acid component, and moistening and agglomeration by the water component. The displacement washing and filtration system is substantially a closed one which is economical as to water requirements, and at the same time is designed for gravity drainage. The feasibility of unassisted gravity drainage is made possible by the leaching procedure which serves not only to convert the oxide copper values into a soluble form but at the same time reduce the amount of slimes formed. Slime reduction is made possible by the agglomeration of the fines onto the coarser ore particles and freedom from agitation during the leaching treatment.

It has been discovered that when copper ore containing oxide values is treated according to the process of this invention, copper recovery is exceedingly high, indicating that the process is both efficient and economical. On the one-ton basis of raw crushed copper ore, acid-moistened and leached as described, and with approximately 0.2 ton of strong filtrate removed to precipitation, the recovery of soluble copper is substantially over 80%.

It will be understood that while the present invention has been described primarily in connection with the recovery of oxide values from copper ores, it is applicable as well for use with other ores, particularly those ores which when crushed produce substantial amounts of fines. The particular acid disclosed and the particular amounts and weights of the components are offered as exemplary of one preferred form of the present invention. Equivalent amounts of acid and other materials are encompassed and included within the scope of the present invention.

The applicability of the process described to ores having small amounts of valuable metals other than copper, as vanadium, uranium, gold, silver and tin, is also encompassed and included within the scope of this invention. The amount of aqueous leaching solvent required to properly react with the leachable component and the amount of water required to achieve the condition of agglomeration may be varied and such amounts should be obvious to a person skilled in the art practicing the invention in accordance with the principles disclosed. Examples of the extraction of valuable metals other than copper from their ores will be described in the examples which follow.

*Example 2*

This example describes the extraction of uranium from an ore with an aqueous acid leaching solution.

The procedure and processing equipment described in Example 1 is employed, but the starting ore is a uranium ore containing 0.40% uraninite ($U_3O_8$). The ore is crushed until it passes through a 28 mesh screen. The ore is then leached with sufficient aqueous solution of sulfuric acid to increase the moisture content of the ore to 14%, with the leaching solution containing sufficient sulfuric acid to constitute 100 pounds per ton of ore. The ore is permitted to stand with the solution of sulfuric acid for 16 hours. The ore is then washed with water using the countercurrent flood washing described in Example 1. Approximately 56.7 pounds of sulfuric acid for each ton of ore is consumed and 94.3% of the uraninite is extracted from the ore. The leached and washed ore filters rapidly providing a sparkling clear filtrate.

*Example 3*

This example describes the extraction of uranium from an ore with an aqueous alkaline carbonate solution.

The procedure and processing equipment described in Example 1 is employed, but the starting ore is a uranium ore containing 0.53% uraninite ($U_3O_8$). The ore is first crushed until it passes through a 28 mesh screen. The ore is then leached with sufficient aqueous alkaline carbonate solution to increase the moisture content of the ore to 15%, with the solution containing 62.4 pounds of sodium carbonate and 15.6 pounds of sodium bicarbonate for each ton of ore. The ore is permitted to stand with the aqueous alkaline carbonate solution for 24 hours. The ore is then washed with water using the countercurrent flood washing described in Example 1. Approximately 78.8% of the uraninite is extracted from the ore. The leached and washed ore filters rapidly.

*Example 4*

This example describes the extraction of gold and silver from an ore using an aqueous cyanide leaching solution.

The procedure and processing equipment described in Example 1 is employed, but the starting ore is a gold and silver ore containing the following contents of valuable metals:

| | | |
|---|---|---|
| Gold | oz. per ton | 0.328 |
| Silver | do | 10.91 |
| Copper | percent | 0.25 |
| Lead | do | 0.32 |
| Zinc | do | 0.47 |

The ore is first crushed until it passes through a 48 mesh screen. The ore is then leached with sufficient aqueous solution of potassium cyanide to increase the moisture content of the ore to 14%, with the cyanide solution containing 10.2 pounds of potassium cyanide per ton of ore. The ore is permitted to stand with the aqueous potassium cyanide solution for 17 hours. The ore is then washed with water using the countercurrent flood washing described in Example 1. Approximately 4.8 pounds of potassium cyanide for each ton of ore is consumed and 88.4% of the gold and 75.9% of the silver is extracted from the ore. The leached and washed ore filters rapidly.

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

We claim:

1. A process for recovering metal values from finely-divided ore, comprising the steps of uniformly moistening said ore with an aqueous solution of leach solvent in amount sufficient to yield soluble metal salts while providing moisture in quantity sufficient to form from fine and coarse ore particles a mass of aggregates, and recovering soluble metal salts from said mass of aggregates by subjecting the same to quiescent submergence in a solvent wash solution for said salts then separating said solution with said salts dissolved therein from said mass solely by gravity drainage from the bottom thereof.

2. The process according to claim 1 in which said ore is mixed during application of the aqueous solution of leach solvent thereto.

3. A process for recovering copper values from finely-divided copper-bearing ore, comprising the steps of uniformly moistening said ore with an aqueous solution of leach solvent in amount sufficient to yield soluble copper salts while providing moisture in quantity sufficient to form from fine and coarse ore particles a mass of aggregates, and recovering soluble copper salts from said mass of aggregates by subjecting the same to quiescent submergence in a solvent wash solution for said copper salts then separating said solution with dissolved copper salts from said mass solely by gravity drainage from the bottom thereof.

4. A process for recovering copper values from finely-divided ore containing copper oxide, comprising the steps of uniformly moistening said ore with an aqueous solution of sulfuric acid in amount sufficient to yield water soluble copper salts from copper oxide while providing moisture in quantity sufficient to form from fine and coarse ore particles a mass of aggregates containing from 7% to 15% total moisture; and recovering water soluble copper salts from said mass of aggregates by the steps of subjecting the same to quiescent submergence in an aqueous wash solution, separating said solution from said mass solely by gravity drainage from the bottom thereof and thereafter subjecting said mass in the quiescent state to repeated submergence in aqueous wash solution followed by gravity drainage therefrom.

5. The process for washing soluble products from loose aggregates of fine and coarse ore particles comprising the steps of introducing a mass of such particles into a container having a bottom drain, compacting said mass by submerging it in quiescent state in a solvent wash liquor for said soluble products and draining said liquor with said products dissolved therein from the bottom of the mass, and thereafter subjecting the mass to a plurality of submerged washes by intermittently supplying wash liquor to the top of said mass while continuously draining such liquor from the bottom of the mass at a rate less than the rate at which such liquor is supplied to the top thereof.

6. A process for recovering metal values from finely-divided ore, comprising the steps of uniformly moistening said ore with an aqueous solution of leach solvent in amount sufficient to yield soluble metal salts while providing moisture in quantity sufficient to form from fine and coarse ore particles a mass of aggregates, and recovering soluble metal salts from such aggregates by introducing a mass of such aggregates into a wash container having a bottom discharge and compacting such mass in such container by submerging it in quiescent state in a solvent wash liquor for said salts then draining such liquor containing said salts dissolved therein from the bottom of the mass, and thereafter subjecting such mass to a plurality of submerged washes by continuously draining wash liquor from the bottom of the mass while intermittently supplying wash liquor to the top of the mass at a greater rate than the rate at which such liquor is drained from the bottom thereof.

References Cited by the Examiner
UNITED STATES PATENTS

| | | | |
|---|---|---|---|
| 697,138 | 4/1902 | Germot et al. | 23—267 X |
| 839,493 | 12/1906 | Macklind | 23—267 X |
| 894,902 | 8/1908 | Patter | 75—117 |
| 1,516,356 | 11/1924 | Taplin | 75—103 |
| 1,553,416 | 9/1925 | Van Arsadle | 75—108 |
| 1,614,668 | 10/1925 | Greenawalt | 75—108 |
| 1,908,994 | 5/1933 | Meyer | 75—97 |
| 2,363,315 | 11/1944 | Grothe | 75—119 |
| 2,716,600 | 8/1955 | Frick | 75—117 |

HYLAND BIZOT, *Primary Examiner.*

RAY K. WINDHAM, DAVID L. RECK, BENJAMIN HENKIN, *Examiners.*

M. A. CIOMEK, H. W. CUMMINGS, N. F. MARKVA, *Assistant Examiners.*